Jan. 11, 1938.  R. C. TARRANT  2,105,170
NURSING BOTTLE AND NIPPLE THEREFOR
Filed April 12, 1937
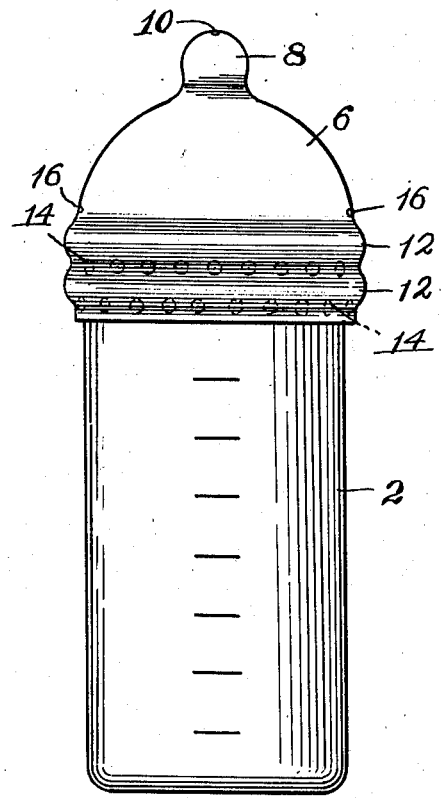
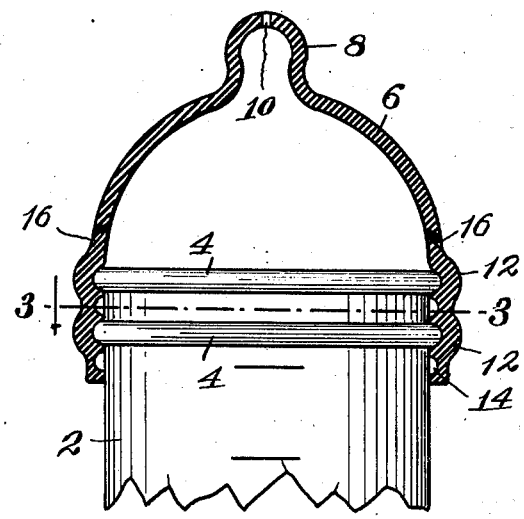
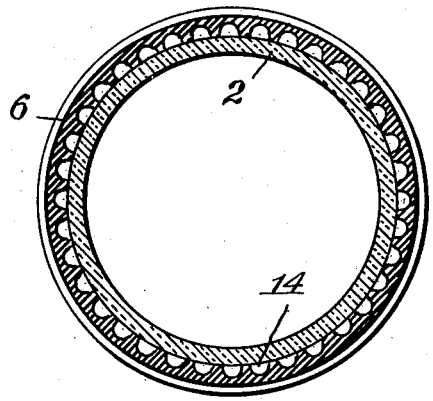
INVENTOR:
R. C. Tarrant,
BY
F. G. Fischer,
ATTORNEY.

Patented Jan. 11, 1938

2,105,170

UNITED STATES PATENT OFFICE 2,105,170

NURSING BOTTLE AND NIPPLE THEREFOR

Robert C. Tarrant, Port Washington, N. Y.

Application April 12, 1937, Serial No. 136,465

5 Claims. (Cl. 215—11)

My invention relates to a nursing bottle and a rubber nipple therefor and one object is to provide a nursing bottle having one or more beads surrounding its upper open end to assist in securing the nipple from accidental displacement.

A further object is to provide a rubber nipple with one or more beads surrounding its large end and adapted to engage over the beads of the bottle in order to cooperate therewith in securing the nipple in position upon the bottle.

Another object is to provide the large end of the nipple with one or more series of vacuum cavities to cooperate with the beads in securing the nipple in position upon the bottle.

A further object is to provide the nipple with one or more air-holes through which air may enter to replace the milk withdrawn by suction and thereby prevent the nipple from collapsing, the shape of the holes being such that they will close and thereby prevent the escape of milk therethrough when the suction ceases.

In order that the invention may be fully understood, reference will now be had to the accompanying drawing, in which:

Fig. 1 shows an elevation of the bottle with the nipple in position thereon.

Fig. 2 is an enlarged view showing the lower portion of the bottle broken away and the nipple in vertical section.

Fig. 3 is a cross section on line 3—3 of Fig. 2.

Referring in detail to the different parts, 2 designates the nursing bottle the upper portion of which is surrounded by a pair of beads 4 spaced one above the other.

6 designates the rubber nipple which is formed with a reduced end 8 having a suitable number of apertures 10 through which communication may be had to the contents of the bottle 2 when the nipple is in position upon said bottle.

The enlarged end of the nipple 6 is surrounded by beads 12 spaced one above another and adapted to engage over the beads 4 to cooperate therewith in holding the nipple 6 in position upon the bottle 2.

In order to further secure the nipple 6 upon the bottle 2, I provide the nipple with rows of internal vacuum cavities 14, one row of which is spaced to come beneath the lowermost bead 4 and the other between the beads (Fig. 2) when the nipple is in position upon the bottle.

The body of the nipple 6 has one or more air-holes 16 which extend upwardly and inwardly at an angle and are tapered towards their inner ends which are normally closed to prevent the escape of milk therethrough.

In practice when the enlarged end of the nipple 6 is being stretched into position over the upper end of the bottle 2, more or less air is forced from the cavities 14 so that vacuums are created which coact with the beads 4 and 12 in holding the nipple in position upon the bottle.

It is obvious that a nipple provided with the vacuum cavities 14 will prove more effective in securing the nipple 6 to the bottle 2 even if the beads 4 and 12 were omitted than if said vacuum cavities 14 were dispensed with, but I prefer to employ the beads 4 and 12 as a further means of reliably securing the nipple in position upon the bottle.

It is also apparent that by providing the nipple 6 with the air-holes 16 the nipple will be prevented from collapsing, as air enters the nipple to replace the milk withdrawn by suction, and since said air-holes 16 automatically close when the suction ceases the loss of milk therethrough will be prevented.

While I have shown the preferred form of my invention, I reserve all rights to such other forms and modifications thereof as properly fall within the spirit and scope of the invention as claimed.

Having thus described my invention, what I claim and desire to secure by Letters Patent, is:

1. In combination, a nursing bottle having an open end, and a nipple having an enlarged end adapted to be positioned upon the open end of the bottle, said enlarged end having an annular row of internal cavities having open ends which are adjacent to the bottle when the nipple is in position thereon.

2. In combination, a nursing bottle having an open end surrounded by a bead, and a nipple having an enlarged end adapted to be positioned upon the open end of the bottle, said enlarged end having an annular row of cavities with open ends which are adjacent to the bottle and below the bead when the nipple is in position upon the bottle.

3. In combination, a nursing bottle having an open end surrounded by two spaced beads, and a nipple having an enlarged end adapted to be positioned upon the open end of the bottle, said nipple having two annular rows of cavities so spaced that one row will come between the beads and the other row beneath the lowermost bead when the nipple is placed upon the bottle.

4. A rubber nipple having an enlarged end provided with an annular row of vacuum cavities.

5. A nursing nipple having an enlarged end provided with a plurality of annular rows of vacuum cavities.

ROBERT C. TARRANT.